(12) United States Patent
Letner et al.

(10) Patent No.: US 9,515,903 B2
(45) Date of Patent: Dec. 6, 2016

(54) SWITCHING MODULE

(71) Applicant: Lockheed Martin Corporation, Bethesda, MD (US)

(72) Inventors: Bernard J. Letner, Apalachin, NY (US); Kenneth R. Twigg, Sayre, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/994,818

(22) Filed: Jan. 13, 2016

(65) Prior Publication Data

US 2016/0164756 A1  Jun. 9, 2016

Related U.S. Application Data

(63) Continuation of application No. 14/509,004, filed on Oct. 7, 2014, now Pat. No. 9,253,030, which is a continuation of application No. 13/267,709, filed on Oct. 6, 2011, now Pat. No. 8,854,980, which is a continuation-in-part of application No. 11/429,218, filed on May 8, 2006, now abandoned.

(60) Provisional application No. 60/678,171, filed on May 6, 2005, provisional application No. 60/678,221, filed on May 6, 2005.

(51) Int. Cl.
| | | |
|---|---|---|
| H04J 1/16 | (2006.01) | |
| H04L 12/26 | (2006.01) | |
| H04L 12/931 | (2013.01) | |
| H04L 12/939 | (2013.01) | |
| H04L 12/933 | (2013.01) | |
| H04L 12/24 | (2006.01) | |
| H04L 12/703 | (2013.01) | |

(52) U.S. Cl.
CPC ............. *H04L 43/04* (2013.01); *H04L 41/069* (2013.01); *H04L 43/0823* (2013.01); *H04L 49/101* (2013.01); *H04L 49/357* (2013.01); *H04L 49/55* (2013.01); *H04L 45/28* (2013.01); *H04L 49/555* (2013.01)

(58) Field of Classification Search
CPC ........ H04L 43/00; H04L 43/04; H04L 41/069; H04L 43/0823; H04L 49/101; H04L 49/357; H04L 12/433; H04L 12/2602
See application file for complete search history.

(56) References Cited

U.S. PATENT DOCUMENTS

| | | |
|---|---|---|
| 3,956,673 A | 5/1976 | Seid |
| 5,726,788 A | 3/1998 | Fee et al. |
| 5,978,578 A | 11/1999 | Azarya et al. |
| 6,320,750 B2 | 11/2001 | Shaler et al. |

(Continued)

FOREIGN PATENT DOCUMENTS

JP  2003-008599  1/2003

OTHER PUBLICATIONS

XILINX Virtex-5 Family Overview, Feb. 6, 2009, Xilinx.

*Primary Examiner* — Brian O'Connor
(74) *Attorney, Agent, or Firm* — Miles & Stockbridge P.C.

(57) ABSTRACT

A fiber channel switching module can include an integrated trace buffer memory, a crossbar switch and a control processor disposed on a single line replaceable module (LRM). The trace buffer memory may be adapted to capture selected data traffic transiting the switch fabric based on pre-selected triggers. The selected data can be read out of the trace buffer memory and used for selected diagnostics.

21 Claims, 11 Drawing Sheets

(56) References Cited

U.S. PATENT DOCUMENTS

| | | |
|---|---|---|
| 6,507,923 B1 | 1/2003 | Wall et al. |
| 6,671,589 B2 | 12/2003 | Holst et al. |
| 6,687,856 B2 | 2/2004 | Jibbe |
| 6,731,646 B1 * | 5/2004 | Banks .................. H04L 49/357 |
| | | 370/422 |
| 6,845,306 B2 | 1/2005 | Henry et al. |
| 6,943,699 B2 | 9/2005 | Ziarno |
| 7,221,650 B1 | 5/2007 | Cooper et al. |
| 7,478,138 B2 | 1/2009 | Chang et al. |
| 7,573,902 B2 * | 8/2009 | Zettwoch ............ H04L 12/2602 |
| | | 370/389 |
| 7,813,369 B2 | 10/2010 | Blackmore et al. |
| 7,860,497 B2 | 12/2010 | Johnson et al. |
| 8,060,832 B2 * | 11/2011 | Kruempelmann .... G06F 9/4443 |
| | | 345/619 |
| 8,332,910 B2 | 12/2012 | Gleeson et al. |
| 8,854,980 B2 | 10/2014 | Letner et al. |
| 9,253,030 B2 * | 2/2016 | Letner .................. H04L 49/357 |
| 2002/0016937 A1 | 2/2002 | Houh |
| 2003/0210387 A1 | 11/2003 | Saunders et al. |
| 2005/0047324 A1 | 3/2005 | Zettwoch |
| 2005/0060574 A1 * | 3/2005 | Klotz ...................... H04L 41/22 |
| | | 726/4 |

* cited by examiner

SWITCHING MODULE

This application is a continuation-in-part of U.S. application Ser. No. 11/429,218, which claims the benefit of U.S. Provisional Application No. 60/678,171, filed May 6, 2005, and U.S. Provisional Application No. 60/678,221, filed May 6, 2005, each of which is incorporated herein by reference in its entirety.

Embodiments relate generally to a method and apparatus for monitoring and capturing network traffic in conventional and fiber optic networks, and, more particularly to a fiber channel switching module having an integrated trace buffer memory (trace buffer).

In conventional and fiber optic networks, a network's architecture is comprised of the communication equipment, protocols and transmission links that constitute the network, and the methods by which they are arranged. In such networks, nodes (subsystems of the network) must communicate with each other, and therefore must connect with each other through data paths. Connections between nodes may be accomplished by means for routing or switching of the data paths. The teens routing and switching are sometimes used to refer to two different means of connecting various nodes through various data paths. This is especially so in some simple network configurations.

A switch may be generally thought of as the central component of a single network. A router, on the other hand, is sometimes generally thought of as an interconnection between two or more networks. As network systems have become increasingly complex however, distinctions between routers and switches have narrowed in that many routers may have switching fabrics with complex switching schemes, and therefore may have full switching capability, and on the other hand, switching fabrics may have routing control capability.

Conventional networks and fiber optic networks are applicable to industries including aerospace, production, manufacturing, rail, naval (ships and submarines), process control, power distribution, telecommunications (LANS, WANS, etc.) and any application having a switch fabric topology.

The term topology, as used herein, refers to the physical layout of a network, or to an approach to configuring a network. With respect to network design, choices of topology vary, and there may be various advantages and disadvantages associated with each choice. For example, in a ring topology (network nodes arranged in a ring), data packets flow in one direction with each node first receiving the data and then transmitting it to the next node in the sequence. With such an arrangement, however, if a single channel between any two nodes fails, then communication on the entire network fails. A Star topology (star arrangement) may have disadvantages such as low bandwidth and a possibility of dead branches. A further topology type (mesh topology) eliminates dead branches by having all nodes connected to all other nodes, with each node switching its own traffic. These topologies are only exemplary, and it is to be understood that nodes of a network may be connected using numerous different topologies, or combinations thereof.

A switch fabric (also referred to as a switching fabric) is an interconnected network of switching elements. A switching element is the basic building block of a switch, and may consist of input controllers and output controllers which provide the input(s) and output(s) to the interconnected network. The switching fabric may be characterized by the types of switching arrangements and by the interconnection of its switching elements. The switching fabric may contain many input ports and output ports and can transport data between the input ports and the output ports. The switching elements that comprise a switching fabric are basically identical and are usually interconnected in a specific topology.

The term "fabric" is used to describe a network's architecture. This term was derived from the resemblance of data paths in a network to the woven fibers of a cloth material.

Types of switching fabrics employed for particular applications may vary greatly, and an ultimate selection of a switching fabric for an application may depend upon on advantages versus disadvantages for each type of switching fabric and the requirements of the application under consideration. Some examples of switching fabric types are shared bus, shared memory and crossbar. Shared bus and shared memory architectures have physical and functional limitations on their scalability. In other words, systems having shared bus or shared memory architectures will eventually slow down or halt under a heavy switching load because the switching capacity of these architectures does not expand according to demand. Architectures which do not expand according the demand placed on them are said to have poor scalability. On the other hand, a crossbar switching fabric may be highly scalable and high performing. An "N×N" crossbar switch is organized as an N×N matrix to connect N input ports to N output ports and can transfer packets from multiple input ports to multiple output ports simultaneously. Each pair of input and output ports has a dedicated path through the switch, and additional ports can be incorporated by increasing the number of switching elements.

When a failure occurs in an embedded system (a subsystem integrated into a larger system), it is useful to know all events that occurred during time periods immediately preceding the failure. In order to obtain knowledge of these events, the events must be captured and stored. The events may be captured and stored by using a trace buffer memory. A trace buffer is a portion of memory that provides a means to capture and store these events, and any other data traffic transitioning a switching fabric. A basic trace buffer is a high speed RAM used to capture in real time all activity on an internal processor bus and pins, for example. A capture and store operation of a trace buffer may be accomplished by a computer program which writes values to the trace buffer when the program executes sections of interest in the program code. The trace buffer can then capture portions of the executed program while the program continues running at full speed. When a failure occurs, a portion of program history may be read out of the trace buffer. The contents of the trace buffer may be read out and examined during program execution without slowing down the processor. Various combinations of logic allows for filtering information to be stored, and also for filtering unwanted information from the trace buffer.

A switching module having a trace buffer memory is useful for monitoring, data recording, capturing fault diagnostics, program debugging, general diagnostics, troubleshooting and repair. The above-described operations may be employed in a fiber channel switch (FCS) by capturing fiber channel (FC) traffic flowing through the fiber channel switch as a minimally intrusive software debug and hardware troubleshooting aid.

BRIEF DESCRIPTION OF THE DRAWINGS

The present invention will be described with reference to the accompanying drawings, wherein.

DETAILED DESCRIPTION

In a Mission Systems Network, a switching module provides the primary path for communications between Integrated Core Processor (ICP) external mission systems processing equipment and ICP internal processing elements. The switching module also provides the primary path for data communication among the processing modules within the ICP. In the Mission Systems Network, fiber optic links in Mission Computers (e.g., ICPs) may be embedded within an internal optical backplane, and accessing or monitoring the links may be difficult or impossible without substantial disassembly.

Figure 1:
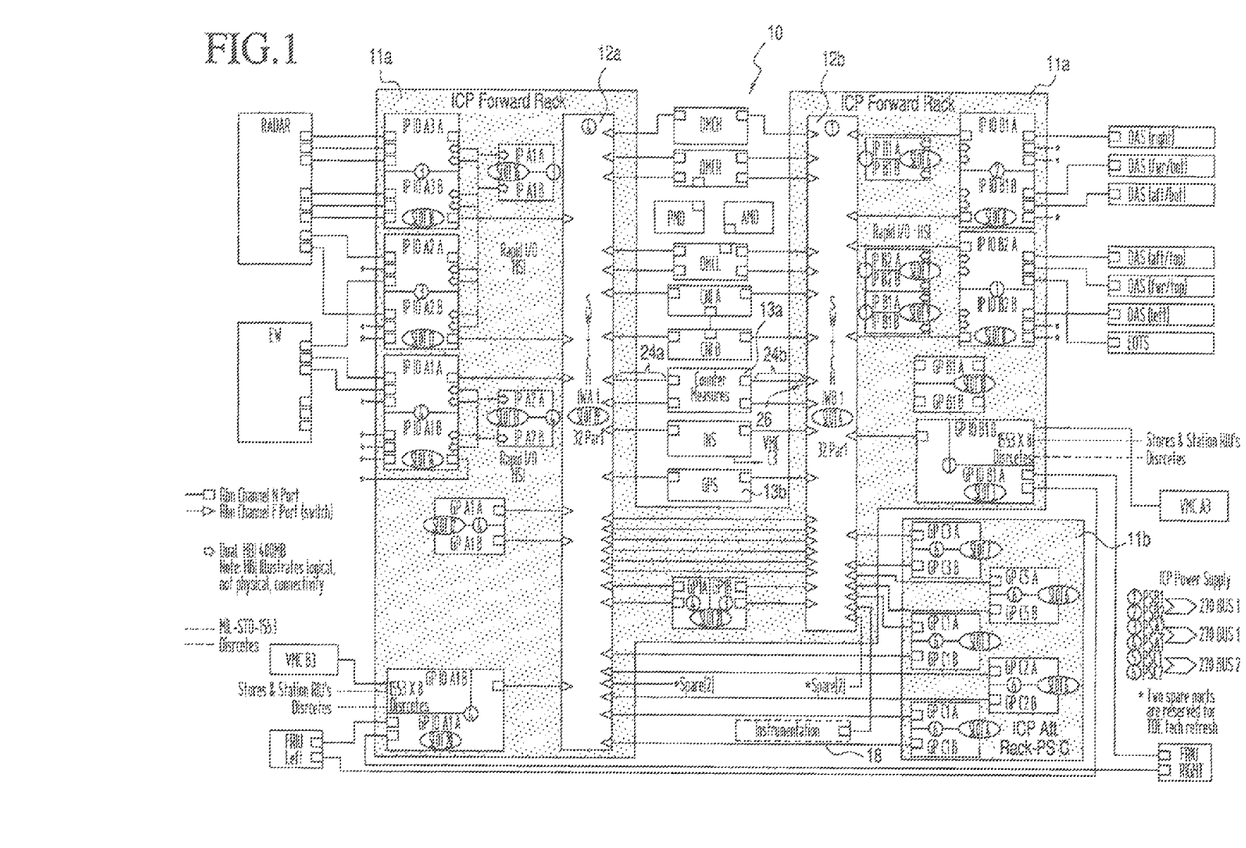
FIG. 1 is a diagram of a Systems Network.

The diagram in FIG. 1 shows an example of a Mission Systems Network (10) in which the present invention may be implemented, including views of the Network's ICP. The ICP is comprised of numerous components which are shown in the stippled areas of the diagram, and therefore the ICP is not itself herein designated by a single reference numeral. These stippled areas represent portions of a physical rack for circuit boards in an enclosure (300), which is generally referred to as an ICP rack. The ICP rack is comprised of ICP forward rack (11a) and ICP aft rack (11b). All components shown in the stippled area of FIG. 1 are housed in the enclosure (300). The components in the ICP rack include fiber channel switching modules (12) having a trace buffer memory disposed thereon (see trace buffer 208, shown in FIG. 2).

Subsystems of the Mission Systems Network (10) are commonly referred to as nodes (13). Examples of nodes (13) are Counter Measures (13a) and Global Positioning Satellite System (13b). Counter Measures (13a), for example, is connected to switching module (12a) via fibers (24a). Similarly, Global Positioning Satellite System (13b) is connected to switching module (12b) via fibers (24b). A portion of lines which represent fibers (24b) is outside of the stippled area and a portion of lines which represent fibers (24b) is inside of the stippled area. For example, portion (26) of fiber (24b) is shown in the shaded area of ICP forward rack (11a). Other lines have all portions thereof entirely inside of the stippled area. Lines which have all portions thereof entirely inside of the stippled area represent fibers which are embedded. Otherwise, the lines and portions of lines in FIG. 1 that are not entirely in the stippled area represent connecters to subsystems or components of the Missions Systems Network(10) which are external to the enclosure (300). The optical fiber connectors (24) may have capacity of 2.125 Gigabytes per second or faster, for example. The ICP of the present invention may be functional with two fiber channel switching modules (12) as shown in the exemplary embodiment of FIG. 1.

Spare ports are provided on each switching module (12) as shown in FIG. 1, for example. An instrumentation port (18), for example, is provided on switching module (12b). A large capacity storage device (discussed later) may be provided at instrument port (18) and used to store data such as data from the trace buffer (208). This will be discussed later in greater detail. The previously mentioned spare ports may be also used (if needed) to add additional storage devices. The storage devices may be located either inside of the enclosure (300) or external to the enclosure (300) and may have storage capacity on the order of hundreds of Gigabytes or more.

Figure 3A:
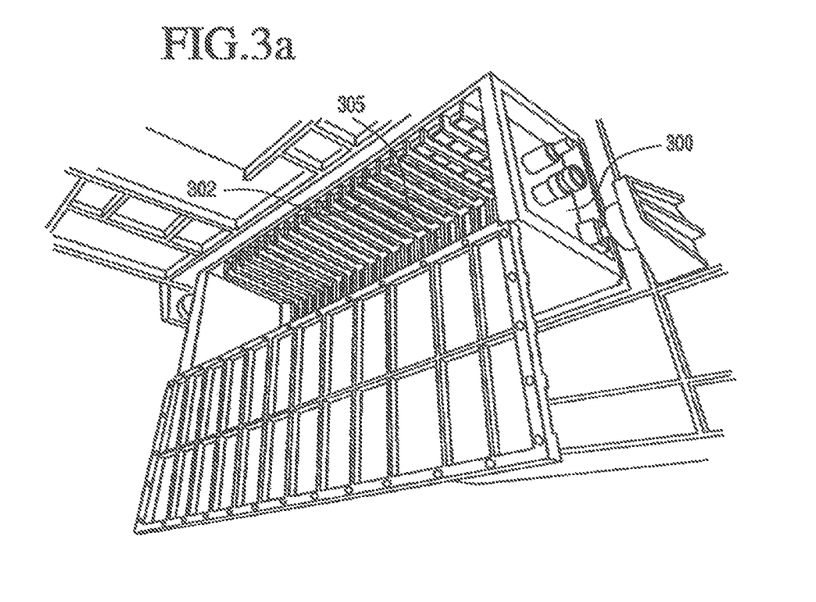
FIGS. 3a-3b shows an enclosure for the fiber channel switching module.
Figure 3B:
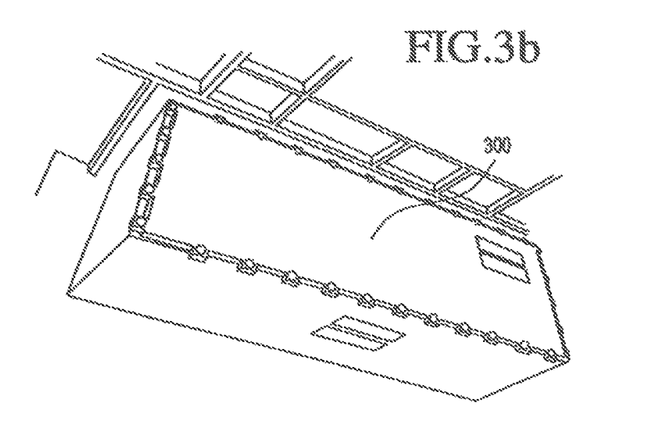

FIGS. 3a and 3b provide views of the enclosure (300). In an opened state of the enclosure (300), the electronic circuitry inside of the enclosure (300) can be damaged by moisture, airborne dust or other contaminants. Further, arcing of electronics inside of the enclosure (300) may provide an unwanted source of ignition. Therefore, the enclosure (300) is sealed during normal operations of the ICP. For example, FIG. 3a shows a view of the enclosure (300) in an opened state wherein the optical backplane (305) can be seen, and FIG. 3b shows a view of enclosure (300) when sealed. The optical backplane (305) shown in FIG. 3a is a portion within the enclosure (300) in which fiber optic cables (24), for example, are embedded. Slots (302) receive a variety of circuit card assemblies, including the fiber channel switching modules (12). By providing the fiber channel switching modules (12) with the trace buffer (208) as an integral part thereof, disassembly or dismantling of the backplane (305) may not be required when performing a variety of diagnostic and debugging tasks. Further, the fiber channel switching module (12) is line replaceable, that is, it can easily be removed from an aircraft and replaced in the aircraft with no tools (or just a few tools) while the aircraft is still on a flight line (runway) rather than having to be directed to a hangar. In other words, the module (12) can be replaced on the run. In an exemplary scenario, an aircraft lands for refueling or minor repairs and urgently needs to take off again and the switching module (12) has also been indicated as needing maintenance. In such a case, the switching module (12) with trace buffer memory (208) can be removed and replaced during the time frame that it takes to refuel the aircraft.

Figure 2:
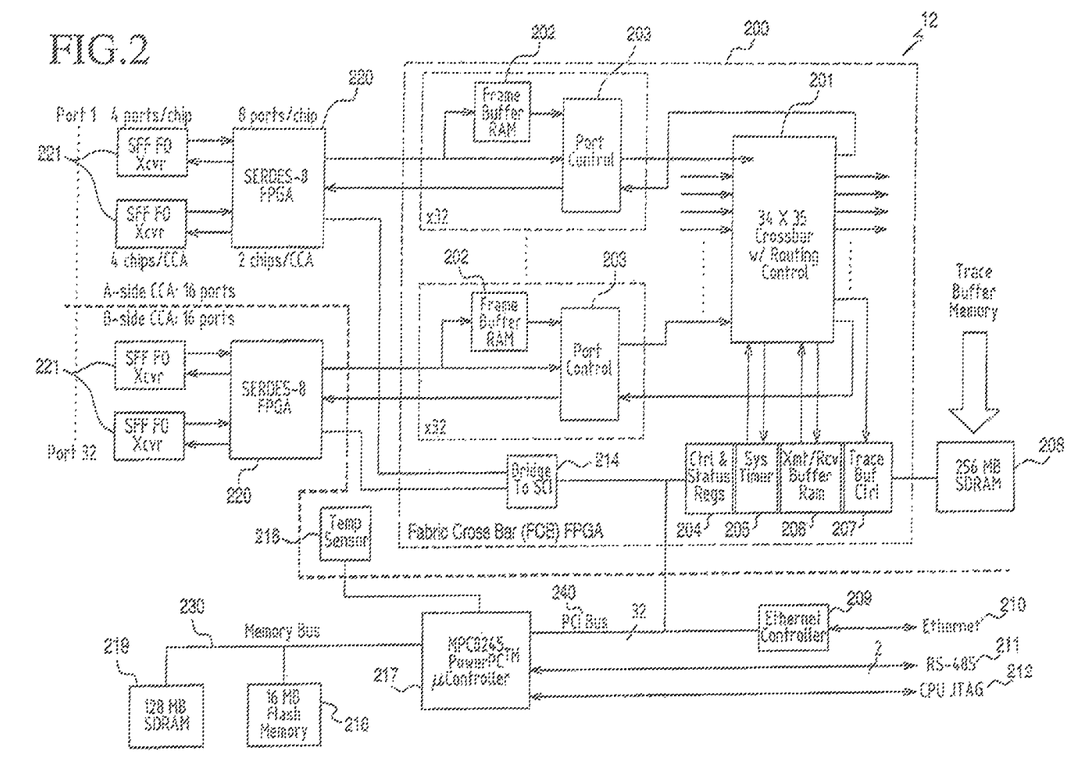
FIG. 2 is a diagram of a fiber channel switching module having a trace buffer memory.

FIG. 2 shows a block diagram of a 32-port fiber channel switching module (12) having two circuit card assemblies. A first circuit card assembly is disposed on an A-side of the switching module (12) and another circuit card assembly is disposed on a B-side of the switching module (12). The A-side circuit card assembly (A-side CCA) provides 16 ports of the 32-port fiber channel switching module (12) and the B-side circuit card assembly (B-side CCA) provides another 16 ports of the 32-port fiber channel switching module (12). The heavy dashed lines on the drawing of FIG. 2 define the two sides of switching module (12) with respect to the two circuit card assemblies.

A Fabric Crossbar (200) shown in FIG. 2 is implemented by means of a field programmable gate array (FPGA). The Fabric Crossbar (200) is comprised of a 34×35 matrix (201), port controls (203), frame buffers (202), bridge (214), control and status registers (204), system timer (205), transmit/receive buffer RAM (206), trace buffer controller (207). At least six frame buffers (202) per port are allocated to the Fabric Crossbar (200). The frame buffers (202) hold incoming and/or outgoing frames and port controls (203) provide port logic to route frames from one port to another. While the matrix (201) shown in FIG. 2 is a 34×35 matrix, the present invention may be implemented with larger or smaller matrixes.

The exemplary trace buffer (208) shown in FIG. 2 has 256 MB SDRAM (Synchronous Dynamic Random Access Memory). However, the size of trace buffer (208) may exceed or be less than 256 MB SDRAM. The trace buffer controller (207) controls what data is written to the trace buffer (208).

There are two serializer-deserializer FPGA (SERDES-8 FPGA) eight port chips (220) on each of the two circuit card assemblies (four total). The Fabric Crossbar (200) provides a connection to the serializer-deserializer FPGA (SERDES-8 FPGA) eight port chips (220) via bridge (214). Each of the two circuit card assemblies also has four small form factor fiber optic transceiver (SFF FO Xcvr) chips (221) disposed thereon, and each of the chips (221) has four ports.

Overall management control for the switching module (12) is provided by MPC8245 Power PC™ microcontroller (217). The MPC8245 Power PC™ (217) is a high-speed integrated processor performing a variety of functions including processing fiber channel messages addressed to the switching module (12). PowerPC Control & Status Registers (204) are accessible to software running on the MPC8245 Power PC™ microcontroller (217). Memory (218) has 128 megabytes of Program RAM and memory (219) has 16 megabytes of Non-Volatile Program Memory. These memories meet only minimum memory requirements for the switching module (12), and therefore they may be larger.

In the embodiment shown in FIG. 2, Ethernet Interface (210) supports 10Base-T and 100Base-Tx and may be used as a primary software development interface. In the exemplary embodiment of FIG. 2, Ethernet controller (209) may provide capability to read data out of the trace buffer (208). PCI (peripheral component interconnect) bus 240 connects the Fabric Crossbar (200) and Ethernet Controller (209). CPU JTAG (joint test action group) interface (212) is connected to the MPC8245 Power PC™ microcontroller (217). Two RS-485 serial channels (211), also connected to the MPC8245 Power PC™ microcontroller (217), may be used as communication channels to external test equipment.

Therefore, according to the arrangement described above, a fiber channel trace buffer memory function may be integrated into a fiber channel switching module design.

Figure 4:
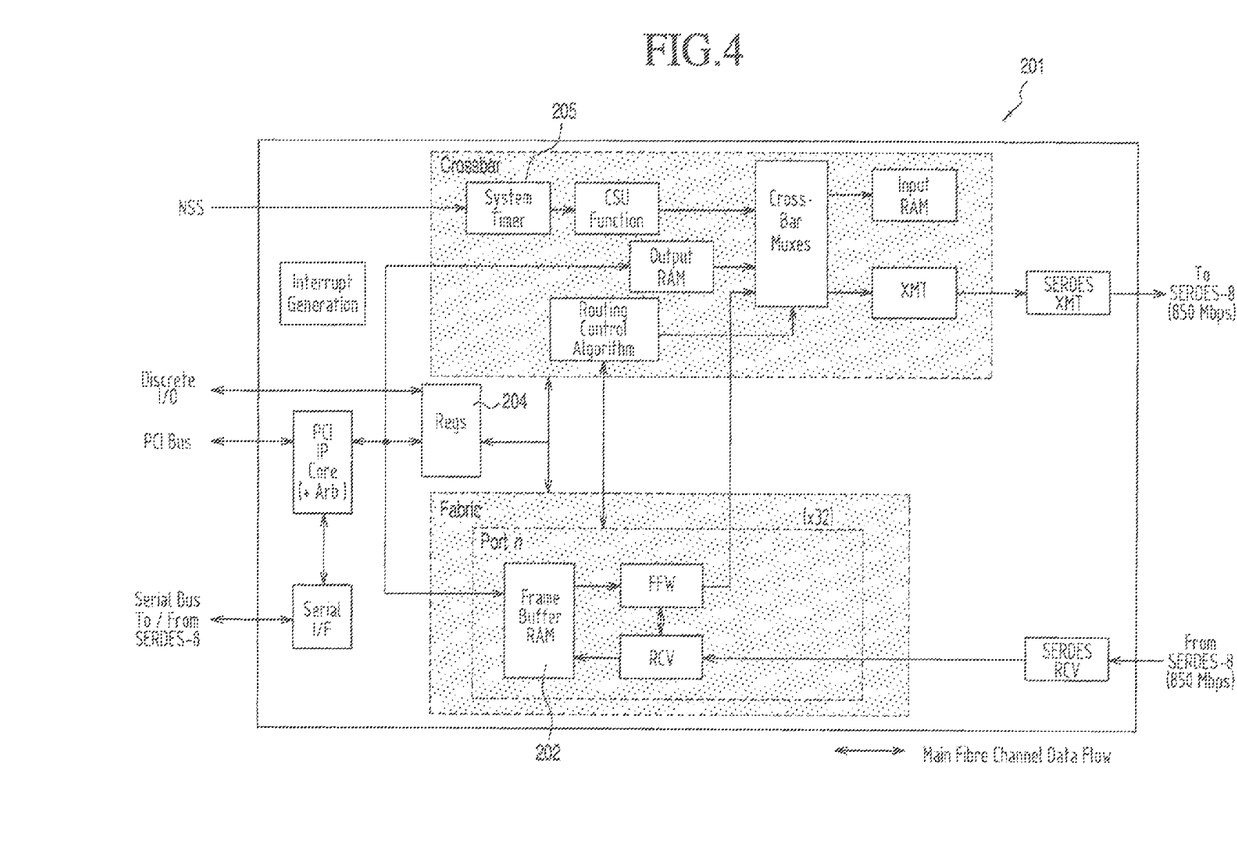
FIG. 4 is a block diagram of the Fabric Crossbar of the present invention having the trace buffer memory.
Figure 5:
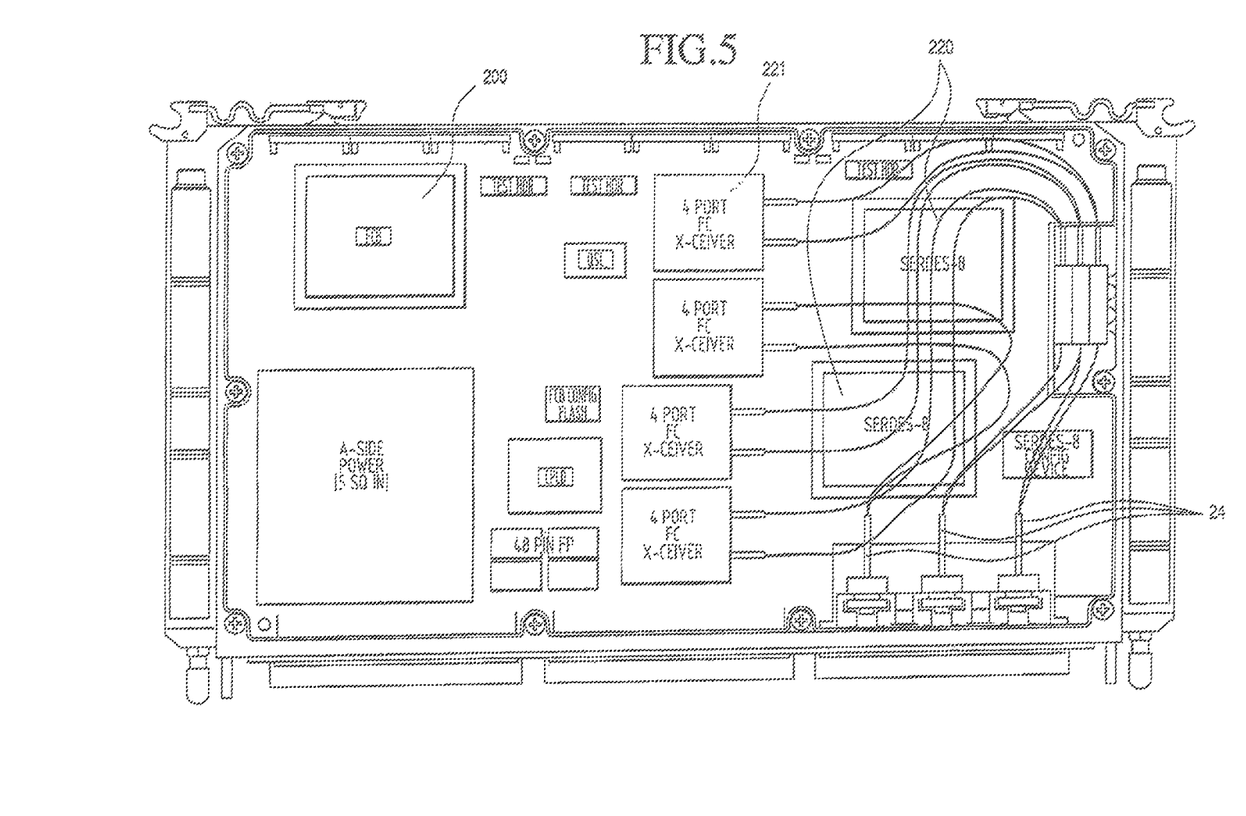
FIG. 5 is an A-side layout of the fiber channel switching module of the present invention.

FIG. 4 shows a block diagram of Fabric Crossbar (200) which includes the trace buffer controller (207) and trace buffer memory (208), and FIG. 5 shows an A-side layout of the switching module (12) including Fabric Crossbar (200).

Figure 6:
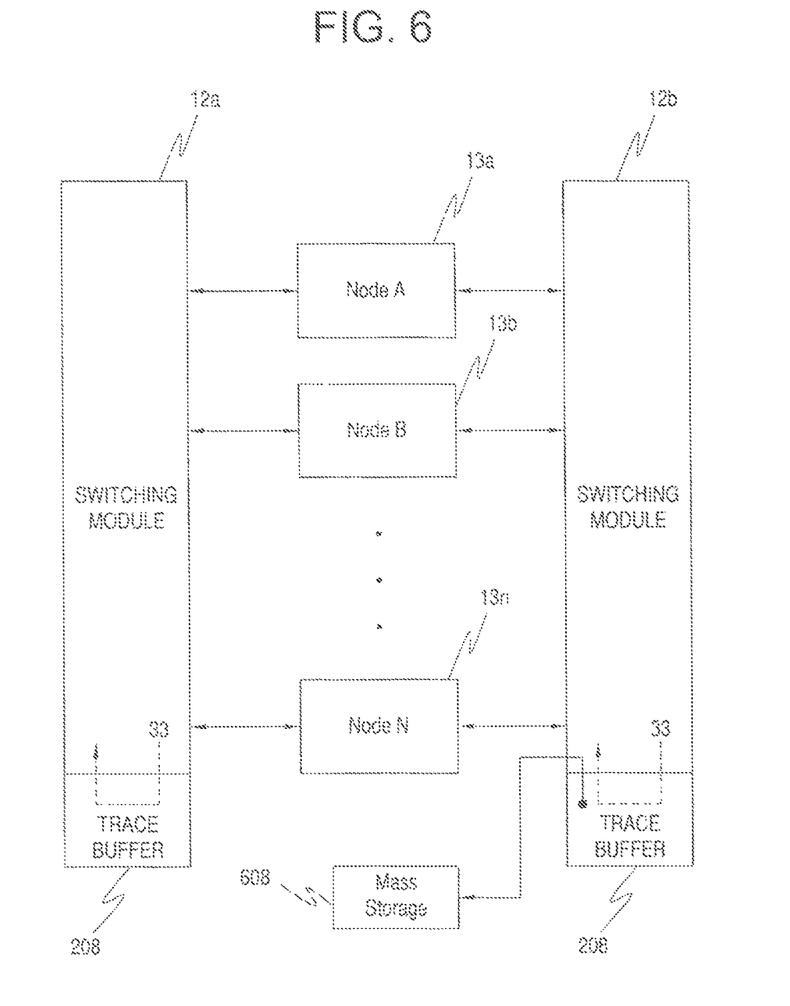
FIGS. 6-7 are diagrams illustrating traffic between nodes and the fiber channel switching module.

Shown in FIG. 6 is a block diagram of the fiber channel switching modules 12(a) and 12(b) having trace buffer memory (208) as an integral portion thereof. The dashed lines (33) indicate that all or a very high percentage of traffic transiting the switching modules (12) may be routed to the trace buffer memory (208). Once captured, data of interest may be offloaded from the trace buffer memory (208) to larger capacity data recording device (608). The larger capacity data recording device (608) may be a large capacity storage device such as a disc or any other type of mass storage device. The number of storage devices is not limited to one, but are rather provided in number, size and type according to need.

To the extent that the fiber channel switching module (12) is the hub of the Systems Network (10), it has access to network traffic without having to make any physical modifications to obtain that access. In one aspect of implementing the present invention, selecting trigger/capture options and dumping the contents of the trace buffer (208) may be accomplished via fiber channel ASM (asynchronous subscriber messages) addressed to/from the trace buffer (208), and processed by switch management function (SMF) software. Selectable capabilities include port monitoring.

In another approach to implementation, the fiber channel switch function of the present invention may be implemented using fiber channel switch Ethernet interfaces wired in the ICP backplane to a front panel test connector. Fiber channel switch hardware design can support either of the above-mentioned approaches.

The trace buffer memory (208) of the present invention, being integrated into the fiber channel switching module (12) can capture any traffic flowing through the switching fabric. In one exemplary scenario, a user can set up various trigger options, specify which ports to capture the traffic from, etc. and then run a test scenario. When a trigger occurs, selected fiber channel traffic may be directed to the trace buffer (208) until the memory is filled up. A user can access the trace buffer (208) via Ethernet, a fiber channel port or some other connection, and the user can read out the trace buffer memory contents. Because the Fabric Crossbar (200) and trace buffer (208) are integrated in a single line replaceable module, the operation of capturing certain data traffic through the fiber channel switching module (12) according to pre-selected triggers may be accomplished in a single packaged unit. However, the construction of the line-replaceable module is not limited to two-sided circuit card assemblies, and may also be implemented using a circuit card assembly having all components disposed upon one side.

Because the trace buffer (208) has capability of capturing all transactions transiting the switch fabric, it can fill up very rapidly. As the trace buffer (208) continuously receives data, it may wrap around, thus overwriting previous data with the new data which is incoming continuously. Accordingly triggers are used to signal a stop to the reception of data and to capture selected portions of the data when an event of interest is detected. A "trigger", as used herein, may be a signal sent to a traced port providing instructions regarding disposition of the data residing in the trace buffer (208). For example, a post-trigger signal may initiate data capture after an event of interest has occurred. In another example, a, pre-trigger signal instructs the trace buffer (208) to capture the data which occurred at a certain specified time before the event of interest occurred. In yet another example, a midtrigger signal instructs the trace buffer (208) to capture the data before the event of interest occurred and after the event of interest occurred.

Figure 7:
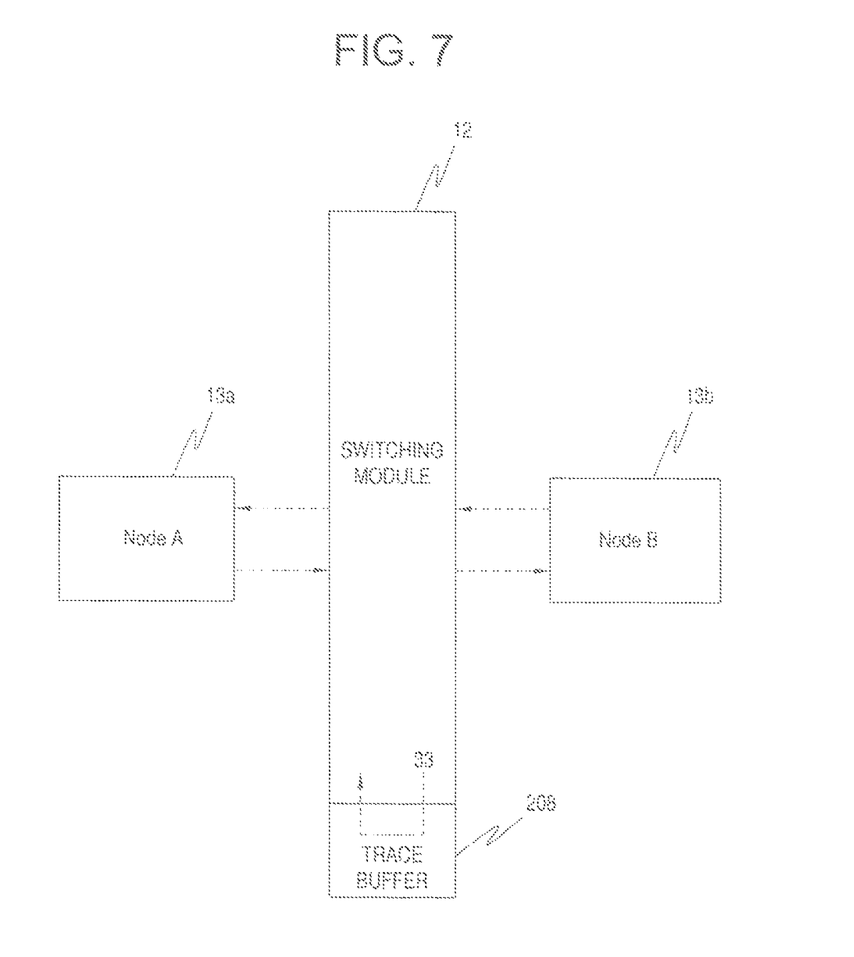

The trace buffer (208) may also offload captured data via a fiber channel to storage located outside the fiber channel switching module (12) for debugging analysis, for example. In an exemplary embodiment, the trace buffer (208) may simultaneously capture data off of a port going into the fiber channel switching module (12) plus a port going out of the fiber channel switching module (12). For example (referring to FIG. 7), when debugging software on a Node A (13a), all traffic around a trigger point (point in time) that Node A is transmitting and receiving may be captured. Additionally transmissions from Node A and receptions from another node, for example, Node B (13b) may be captured (or vice versa). In this example, the trace buffer (208) provides capability to trace multiple items from multiple ports.

In particular, an embodiment can include a fiber channel switch line replaceable module (LRM), e.g., such as that shown in FIG. 2. The FCS LRM can include an embedded trace buffer memory (e.g., a trace buffer memory that is installed on and integrated with the LRM), a fabric crossbar formed in a programmable logic device configured to perform fabric crossbar functions (e.g., a field programmable gate array (FPGA) or the like), and a control processor.

According to an embodiment, the fiber channel switch can include a network-level (or system-level) monitoring and/or debugging section (e.g., a trace buffer memory controller) that has simultaneous access to all of the network traffic flowing through the switch from all nodes connected to the fiber channel switch and can monitor, and capture data from, the entire network of nodes connected to the LRM. This capability goes beyond merely monitoring a single node, both sides of a full duplex channel of a single node, or a fixed group of nodes, and can include monitoring traffic flowing between any of the multiple, different nodes that may be connected to the fiber channel switch LRM.

Further, the network-level monitoring section can be configured with monitoring parameters including trigger events and actions to be taken when a trigger event occurs. For example, the monitoring section can be configured to monitor the traffic of a first node for a predetermined trigger event and, in response to the detection of that event, capture traffic flowing to or from a second node that is different from the first node. Also, the system can monitor for complex trigger events that include a combination of events occurring in the traffic flowing to or from a first plurality of nodes and then, in response, capture data flowing to or from a second plurality of nodes. The first and second plurality of nodes can be completely different groups of nodes, can be the same group of nodes, or can have some nodes in common. For example, traffic flowing between a first pair of nodes, Nodes A and B, can be monitored and used to trigger data capture of traffic flowing between a second pair of nodes, Nodes C and D.

The monitoring parameters can be changed remotely and/or dynamically. For example, a user can send a message to a well-known address of the fiber channel switch to change the monitoring parameters (e.g., trigger events and actions) of the monitoring section. Additionally, as described herein, the fiber channel switch can be configured for use in an aircraft. The monitoring section can receive and process a monitoring parameter change message sent while the aircraft is in flight, thus dynamically changing the monitoring parameters during flight operations of the aircraft. Thus, the nodes and/or channels being monitored and/or captured can be selected via software and do not require the connection or disconnection of physical lines or cables. The monitoring section can be selectively controlled to monitor and/or capture data from any of the nodes attached to the fiber channel switch.

A communication system, for example in an aircraft, can include multiple fiber channel switch line replaceable modules (see, e.g., FIG. 6). A fiber channel switch line replaceable module with an integrated monitoring section and trace buffer memory can provide for network-level monitoring capacity that can scale according to the number of installed LRMs. For example, the capacity of a system can be expanded by adding additional LRMs and, with each additional LRM, the network-level monitoring and built-in trace buffer memory increases accordingly.

Also, an embodiment can provide for network-level monitoring capability that resides in a standby LRM in a dual redundant configuration (because the standby LRM has the network-level monitoring section and integrated trace buffer memory described above). In the event of a fail over from the main LRM to the standby LRM, network-level monitoring and trace buffer capabilities remain continuously available and active, according to the monitoring parameters.

Triggers can be used to determine when the trace buffer starts capturing and storing data so that specific traffic can be captured. Trigger options may include pre-trigger, post-trigger and mid-trigger. Trigger options may also include percentages. Trigger options may include a specific ASM label, specific destination port, specific source port and various combinations thereof. Further, combination logic of any of the above may be used to trigger monitoring and storing of traffic. For example, a trigger event may be a specific ASM label, with triggering set up to capture data at mid-trigger. In another example, however, triggering requires detection of both a specific ASM label and specify that data must also be arriving at a specific source port before data capture commences (more than one event has to occur in order to trigger). A trigger may also include specific header information in a message from a first node and specific message body information from a second node. The first and second nodes can be the same or different nodes.

Storage options may include time stamp on each entry (capture data when messages arrive and leave the switch). Time stamp synchronization may be with external time measure or with an internal time measure. Storage options may include storing all fiber channel message traffic (i.e., headers+payload data) or storing headers only (source, destination, ASM label, word count, etc.) and any pre-selected combinations. For example, when data is transmitted in the Systems Network (10), each unit of data includes header information and the information being sent. The header may identify the source and destination of the information as well as information identifying or describing the type of information being transmitted or the structural layout of the information being transmitted. In many instances, the header information is stripped from the actual data before the data reaches its destination. As a result, only the payload data is received by the destination. In some instances, the payload data is not needed because the only information of interest is contained in the header. Since the trace buffer memory (208) has finite storage capacity, data capture may be limited to necessary data only. In an exemplary scenario, a start-stop signal may initiate the start of data capture and may also stop data capture in order to limit data storage in the trace buffer (208).

In the exemplary embodiment shown in the figures, a trace buffer (208) may be provided on each switching module (12). The locations of elements on the fiber channel switching module (12), including the trace buffer (208) may be rearranged according to design considerations.

Figure 8:
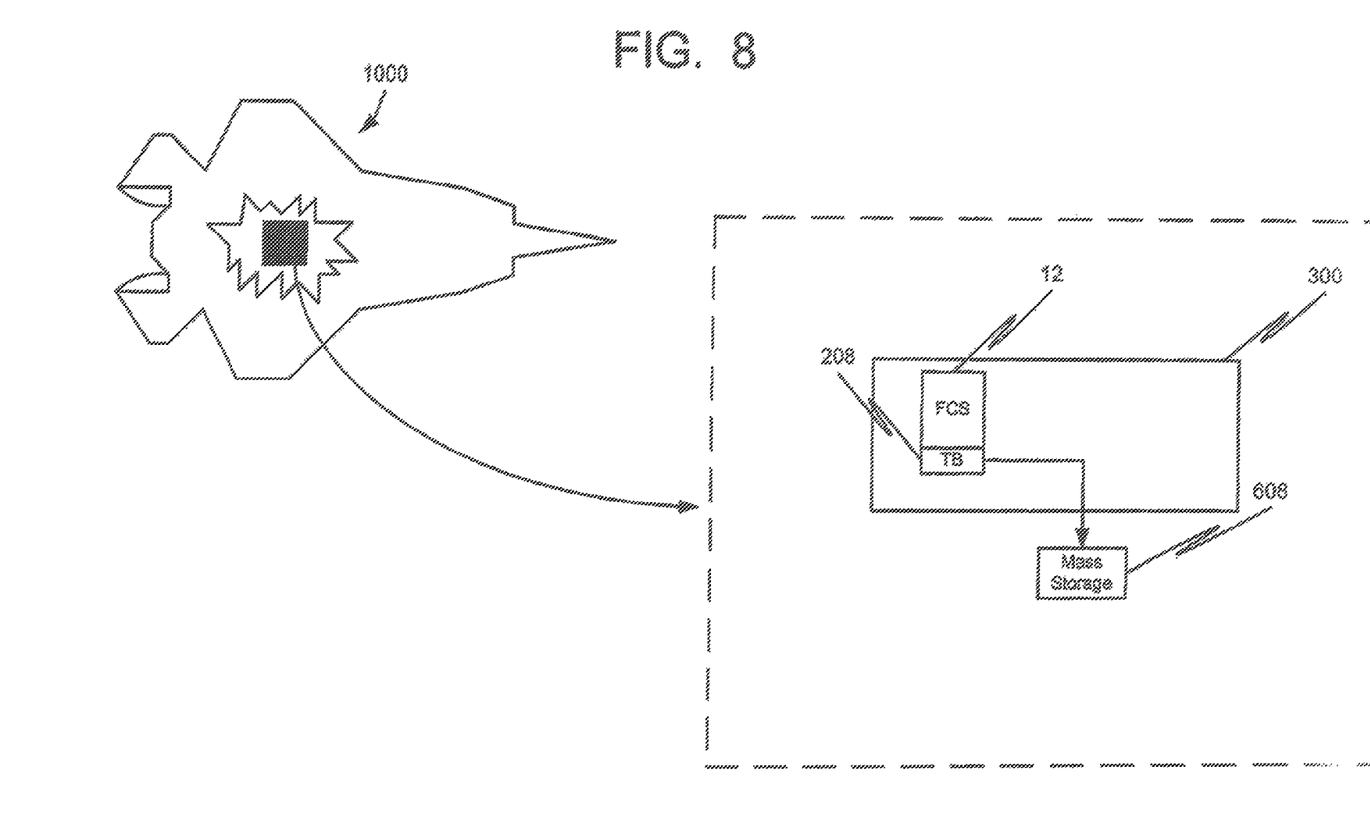
FIG. 8 is a diagram showing an embodiment of the present invention on an aircraft.

FIG. 8 shows an aircraft (1000) which houses the enclosure (300), switching module (12) having trace buffer (208) and storage medium (608). In the embodiment shown in FIG. 8, switching module (12) having trace buffer (208) is housed inside enclosure (300). Storage medium (608) is outside of the enclosure (300). In this embodiment, storage medium (608) may be operatively located on the aircraft. When storage medium (608) is located on the aircraft, it may be removably installed in the aircraft. For example, during flight of aircraft (1000) storage medium (608) may collect data captured by trace buffer (208) from the fiber channel switch of switching module (12). Then, mass storage (608) may be removed from aircraft (1000) for analysis during maintenance. Alternatively, mass storage (608) may be located on the ground or in another aircraft, in which case data captured by trace buffer (208) may be transferred wirelessly to mass storage (608).

Figure 9:
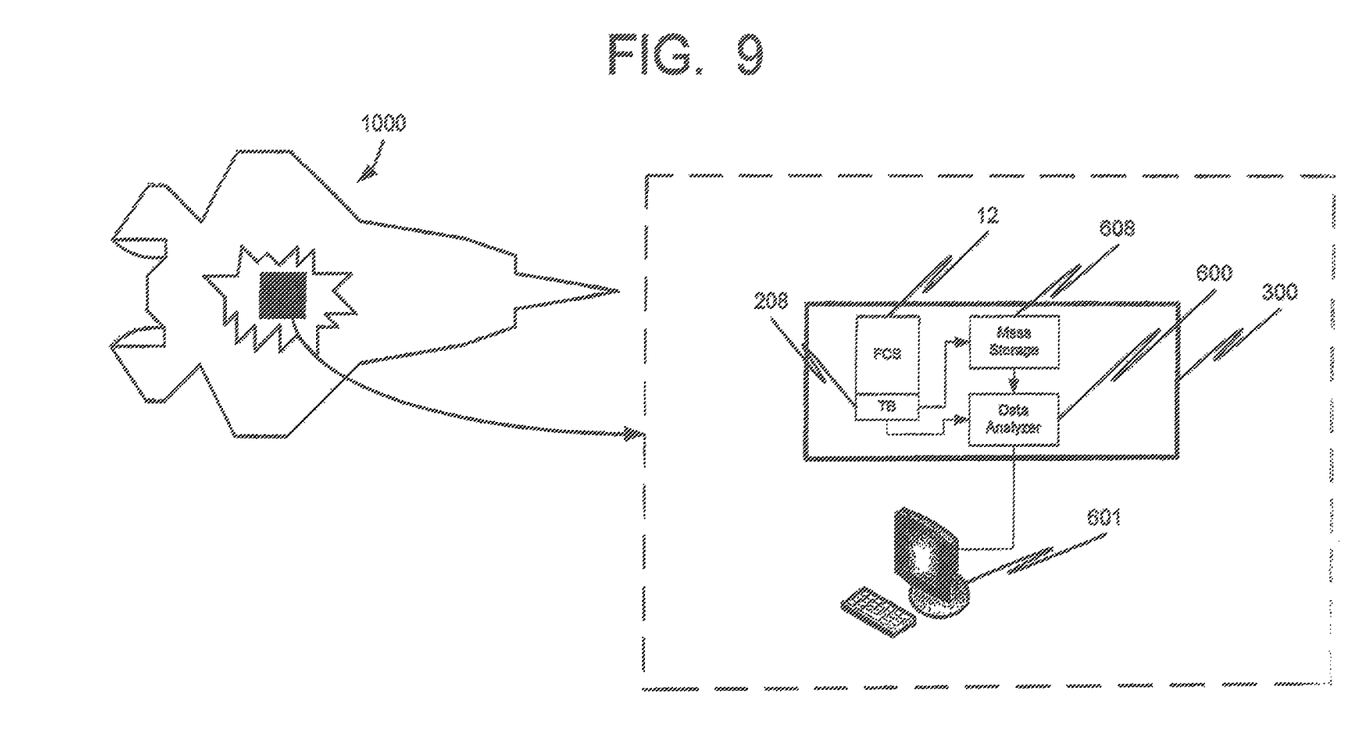
FIG. 9 is a diagram showing another embodiment of the present invention on an aircraft.

FIG. 9 shows an aircraft (1000) which houses the enclosure (300), switching module (12) having trace buffer (208), storage medium (608), data analyzer (600) and terminal (601) with keypad for accessing data. In the embodiment shown in FIG. 9, switching module (12) having trace buffer (208), storage medium (608) and data analyzer (600) are housed inside enclosure (300). Data analyzer (600) may be mounted on a line replaceable module inside enclosure (300). Mass storage (608) may be located on the same line replaceable module. The line replaceable module may comprise a circuit board. Terminal (601) and a keypad may be provided outside of enclosure (300). In one alternative, terminal (601) and keypad may be mounted on a face of enclosure (300). In another alternative, terminal (601) may be located outside aircraft (1000) and communicate wirelessly with data analyzer (600). In any of the embodiments, the data analyzer (600) and terminal (601) with keypad may also be used to provide access necessary to fix problems in program code.

Figure 10:
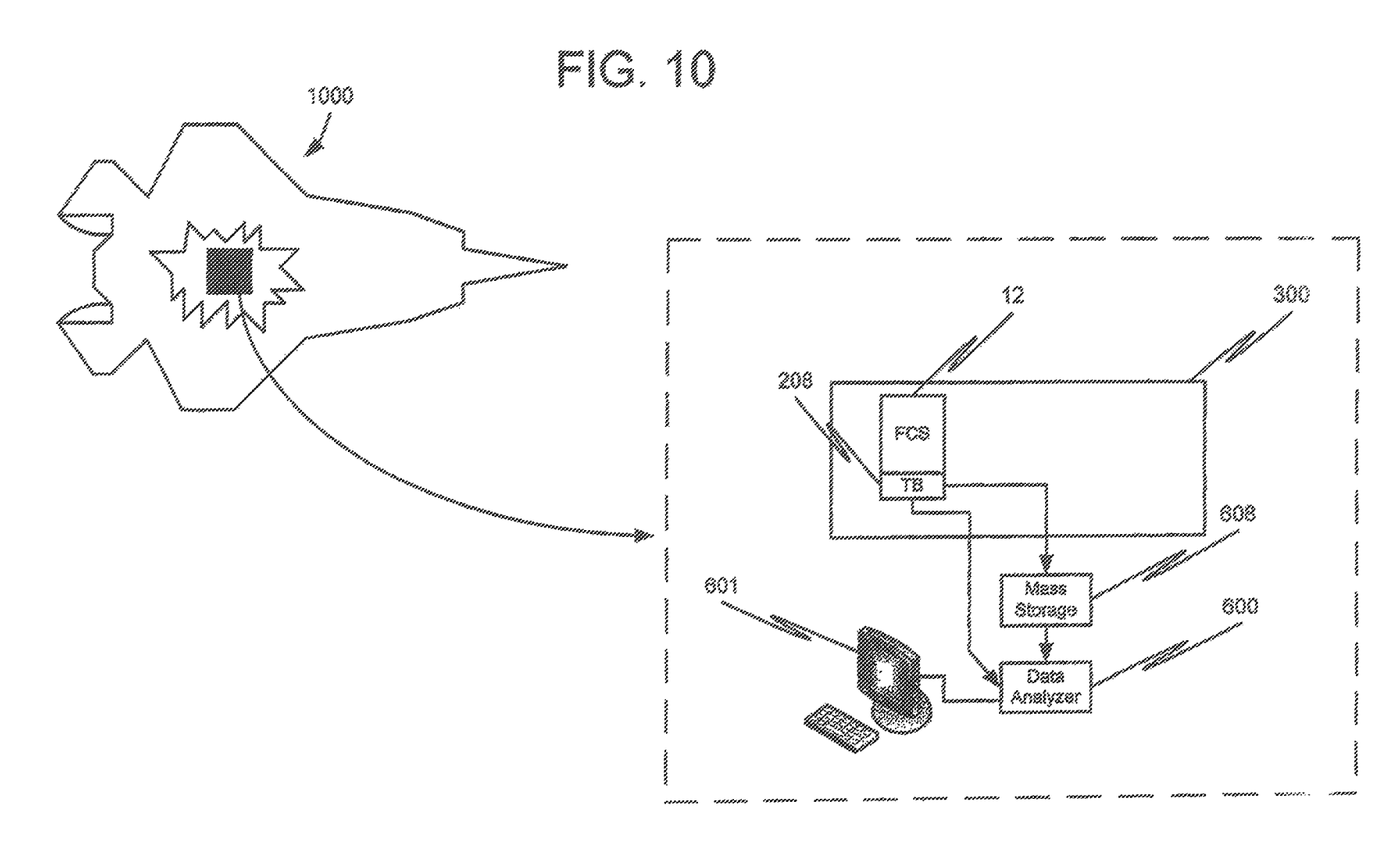
FIG. 10 is a diagram showing another embodiment of the present invention on an aircraft.

FIG. 10 shows another embodiment of the present invention in which the storage medium (608) and data analyzer (600) are both outside of the enclosure (300). With such a configuration, mass storage (608) and/or the data analyzer (600) may be removed from the aircraft (1000) and taken to another location to analyze the captured data. During flight, data analyzer (600) may communicate with flight systems aboard aircraft (1000) or with computer systems on the ground or on other vehicles.

Figure 11:
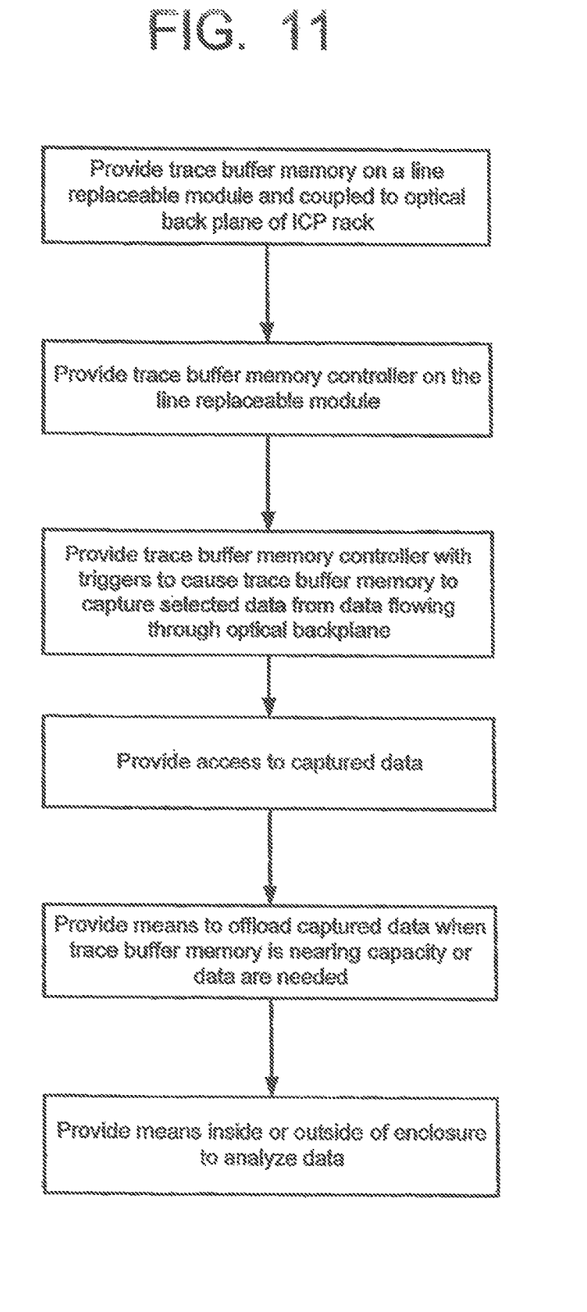
FIG. 11 is a diagram of a method according to the present invention.

FIG. 11 shows a method according to the present invention. A network system of the present invention is comprised of at least one multi-port channel switching module for a fiber optic network, a trace buffer memory physically integrated with the switching module in the enclosure, one or more controllers in the enclosure being adapted to cause portions of information selected from data transiting the switching module from other modules in the enclosure through an optical backplane to be stored in the trace buffer memory, the selected information being selected according to one or more predetermined trigger options.

In the network system of the present invention, it is preferable that the multi-port channel switching module be a line replaceable module comprising a substrate, a switch fabric supported by the substrate and adapted to handle data traffic between nodes external to the line replaceable module and a trace buffer memory supported by the substrate and adapted to selectively record communications transiting the switch fabric. The substrate may be a circuit board, for example.

A network system of the present invention comprises subsystems which communicate with each other on an aircraft, the network system having various components adapted for communication via a backplane, including at least one multi-port optical fiber channel switching module, a trace buffer memory, and one or more controllers being housed within at least one sealed rack having slots thereof dimensioned for receiving the components, said module having one or more input ports and one or more output ports and being adapted to transmit and receive information between said subsystems, operations of said controllers including monitoring of said information at said input ports and said output ports, selective routing of the monitored information from any said input ports to any said output ports, storing of selected portions of said monitored information in said trace buffer memory and management of the stored selected portions by reading, transferring, erasing and replacing information contained therein, said storing being based upon at least one trigger option, said trigger option being a logical combination of a message label, message type, ASM label, destination port, source port and word count, said trigger option including a pre-trigger option, a mid-trigger option, a post-trigger option and start-stop storage options, said monitored information being time stamped, said stored selected portions including only headers of said monitored information as a first selected option, said stored selected portions including only payload of said monitored information as a second selected option, said stored selected portions including headers and payload of said monitored information as a third selected option, said system including means located internal and external to said sealed rack for accessing and analyzing said monitored information, said trace buffer memory being integrated with a switch fabric of said module, and said system being adapted for hardware and software diagnostics and debugging. The trigger option can be based on traffic to or from a first node and the capturing can be performed on data to or from a second node, different from the first node.

A method according the present invention comprises providing a trace buffer memory on a line replaceable module and coupled to an optical backplane of an integrated core processor rack, providing a trace buffer memory controller on the line replaceable module, programming the trace buffer memory controller with triggers to cause the trace buffer memory to capture selected data from data flowing through the optical backplane, providing access to the captured data, optionally providing means to offload the captured data when the trace buffer memory is nearing capacity or when data is needed, and providing means to analyze the offloaded data with the data analyzer embedded in or separate from the line replaceable module.

While the invention has been particularly shown and described with reference to the preferred embodiments thereof, it will be understood by those skilled in the art that various changes and modifications may be made without departing from the spirit and scope of the invention.

What is claimed is:

1. A method for monitoring network data, the method comprising:
    providing a fiber channel switch module including a fabric crossbar including a network level monitoring section having simultaneous access to traffic flowing among all nodes connected to the fiber channel switch module;
    monitoring, by the fiber channel switch module, network traffic;
    detecting a trigger event in network traffic between a first node and a second node; and
    capturing, in response to detection of the trigger event, select data from network traffic between a third node and a fourth node,
    the first, second, third, and fourth nodes all being different than each other, and
    the trigger event including information from both the first node and the second node.

2. The method of claim 1, wherein the monitoring includes monitoring network traffic based on monitoring parameters.

3. The method of claim 2, further comprising:
    changing the monitoring parameters by reading and processing a fiber channel message sent to a well-known address of the fiber channel switch module.

4. The method of claim 3, wherein the fiber channel switch module is configured to be installed on an aircraft.

5. The method of claim 4, further comprising:
receiving and processing the fiber channel message when the aircraft is in flight; and
dynamically updating the monitoring parameters when the aircraft is in flight.

6. The method of claim 1, wherein the trigger event includes a combination of events.

7. The method of claim 6, wherein at least a portion of the network traffic includes a message label, and the combination of events includes a first event that is triggered based on the message label and a second event that is not triggered based on the message label.

8. A method for continuous network-level monitoring of network data, the method comprising:
providing a first fiber channel switch module including
a first fabric crossbar including a first network-level monitoring section having simultaneous access to traffic flowing among all nodes connected to the first fiber channel switch module;
providing a second fiber channel switch module including
a second fabric crossbar including a second network level monitoring section having simultaneous access to traffic flowing among all nodes connected to the second fiber channel switch module;
monitoring, by at least one selected from the first network level monitoring section and the second network level monitoring section, network traffic;
detecting a trigger event in network traffic,
the trigger event including at least one of (i) a first trigger event between a first node and a second node connected to the first fiber channel switch module using the first network level monitoring section, and (ii) a second trigger event between a first node and a second node connected to the second fiber channel switch module using the second network level monitoring section;
capturing at least one selected from (i) select data from network traffic between a third node and a fourth node connected to the first fiber channel switch module in response to detection of the first trigger event, and (ii) select data from network traffic between a third node and a fourth node connected to the second fiber channel switch module in response to detection of the second trigger event; and
utilizing the second fiber channel switch module as a redundant replacement for the first fiber channel switch module, and, when a failure of the first fiber channel switch module is detected, operating the second fiber channel switch module as the main fiber channel switch module to provide continuous network-level monitoring of network traffic.

9. The method of claim 8, wherein the first monitoring section and the second monitoring section are both configured to monitor network traffic based on monitoring parameters.

10. The method of claim 9, wherein the first fiber channel switch module and the second fiber channel switch module are both further configured to change the monitoring parameters by reading and processing a fiber channel message sent to a well-known address of the first fiber channel switch module and second fiber channel switch module, respectively.

11. The method of claim 10, wherein the first and second fiber channel switch modules are configured to be installed on an aircraft.

12. The method of claim 11, further comprising:
receiving and processing the fiber channel message when the aircraft is in flight; and
dynamically updating the monitoring parameters when the aircraft is in flight.

13. The method of claim 8, wherein
the first trigger event including information from both the first node and the second node connected to the first fiber channel switch module, and
the second trigger event including information from both the first node and the second node connected to the second fiber channel switch module.

14. A system for network-level monitoring of data, the system, comprising:
a fiber channel switch module having a fabric crossbar;
a controller on the fiber channel switch module;
the controller having settable monitoring parameters including one or more triggers adapted to cause the fiber channel switch module to capture selected data from network traffic data flowing through an optical backplane, the fiber channel switch module being adapted to simultaneously monitor traffic flowing to and from each node connected to the fiber channel switch module; and
the fiber channel switch module being adapted to monitor network traffic of a first node and detect a trigger event in the network traffic of the first node, the trigger event including information from the first node, and,
in response to detection of the trigger event, the fiber channel switch module being adapted to capture select data from network traffic of a second node, the second node being different than the first node.

15. The system of claim 14, wherein the fiber channel switch module is configured to change the monitoring parameters by reading and processing a fiber channel message sent to a well-known address of the fiber channel switch.

16. The system of claim 15, wherein the fiber channel switch module is configured to be installed on an aircraft and is further configured to
receive and process the fiber channel message to change the monitoring parameters while the aircraft is in flight; and
dynamically update the monitoring parameters while the aircraft is in flight.

17. The system of claim 16, wherein the fiber channel switch module is configured to provide access to the captured select data.

18. The system of claim 17, wherein the fiber channel switch module is configured to automatically transfer the captured select data to an external storage device when preselected criteria are met.

19. The system of claim 18, wherein the preselected criteria include a memory of the fiber channel switch module approaching capacity.

20. The system of claim 14, wherein the trigger event includes a combination of events.

21. The system of claim 20, wherein at least a portion of the network traffic data includes a message label, and the combination of events includes a first event that is triggered based on the message label and a second event that is not triggered based on the message label.

* * * * *